United States Patent Office 2,969,323
Patented Jan. 24, 1961

2,969,323

PHOSPHOSULFURIZED LUBRICATING OIL ADDITIVE

Peter J.V.J. Agius, Abingdon, Alan M. Dominey, Oxford, and Ronald E. Pegg, Kennington, near Oxford, England, assignors to Esso Research and Engineering Company, a corporation of Delaware No Drawing. Filed Aug. 12, 1957, Ser. No. 677,753

Claims priority, application Great Britain Aug. 23, 1956

7 Claims. (Cl. 252—32.7)

The present invention relates to a method of reacting a phosphorus sulphite with a hydrocarbon in the presence of a plasticiser.

Decreasing carbon and sludge deposition in an internal combustion engine by the addition of detergent additives to lubricating oil is an established procedure. These detergent additives are particularly useful in lubricants which are employed to improve the operation of internal combustion engines by preventing or retarding corrosion, piston ring sticking, cylinder wear, and carbon and varnish formation. One class of detergent additives can be prepared by the reaction of certain hydrocarbons and phosphorus sulphide. The reaction of a hydrocarbon and phosphorus sulphide is often referred to as phosphosulphurisation.

It has been discovered, and this discovery instigated an investigation which resulted in the present invention, that useful detergents could be obtained by phosphosulphurising hydrocarbon polymers and depolymerised hydrocarbon polymers but when the mean molecular weight of these polymers exceeded 10,000 it was difficult, and in many instances impossible, to intimately mix the reactants under the desired reaction conditions. In general it has been found that a large temporary increase in viscosity occurs during phosphosulphurisation. The use of a thinner, i.e. a plasticiser, was investigated and it has been discovered, and this discovery forms the basis of the present invention, that a mixture of hydrocarbon polymers, with a mean molecular weight in excess of 10,000 may be successfully phosphosulphurised when in the presence of a plasticiser consisting of hydrocarbons with a mean molecular weight below 350. The products may be used as detergent additives or precursions thereof. In many examples investigated, the high sludge suspending power observed indicated that the function of the hydrocarbons with a molecular weight below 350 was not simply that of a diluent and plasticiser.

The process of the present invention comprises reacting a phosphorus sulphide with a mixture of a major proportion of a hydrocarbon polymer or depolymerised hydrocarbon polymer, each with a Staudinger mean molecular weight above 10,000 and a minor proportion of a plasticiser consisting of hydrocarbons with a mean molecular weight below 350.

The process of the present invention may be carried out by adding the phosphorus sulphide to the mixture of polymer and plasticiser, i.e. hydrocarbons with a mean molecular weight below 350, and mixing at an elevated temperature. A suitable reaction temperature is from 150 to 250° C. and the preferred temperature is from 180 to 230° C. The preferred reaction time is from 5 to 10 hours. It is preferred that the amount of phosphorus sulphide should be less than 17% and preferably from 8 to 15 wt. percent based on the total reaction mix. The reaction may be carried out in the absence of oxygen by blanketing with an unreactive gas such as nitrogen. A suitable apparatus for the reaction is a heated stainless steel or glass-lined vessel equipped with an efficient stirrer, a reflux condenser, provision for nitrogen blanketing, and a screw-feed for addition of phosphorus sulphide.

It is desirable to raise the temperature of the hydrocarbon mixture to 150 to 200° C. before the addition of phosphorus sulphide.

The phosphorus sulphide which can be employed includes $P_2S_3$, $P_2S_5$, $P_4S_3$, $P_4S_7$ or other phosphorus sulphide and is preferably phosphorus pentasulphide ($P_2S_5$). Mixtures of two or more phosphorus sulphides may also be employed and the term phosphorus sulphide, used herein, may include such mixtures. The phosphorus sulphide may be formed in situ by adding phosphorus and sulphur to the polymer and/or plasticiser.

The hydrocarbon polymers with mean molecular weights above 10,000 within the scope of the present invention will next be described. The hydrocarbon polymers which may be elastomers may be derived from olefins and mixtures of olefins preferably containing less than 10 carbon atoms. The preferred polymers have a mean molecular weight range from 10,000 to 20,000 and may be obtained by preparing polymers within this mean molecular weight range or by depolymerising hydrocarbon polymers with higher mean molecular weights to the desired mean molecular weight. The essentially saturated polymers derived from the polymerisation of $C_3$ to $C_6$ mono-olefins, i.e. isobutene, may be advantageously used in this invention. These polymers of isobutene are often referred to as polybutenes.

Copolymers derived from the copolymerisation of $C_3$ to $C_7$ mono-olefins with less than 5% of $C_4$ to $C_6$ diolefins are preferred and are particularly preferred when the copolymer so produced is depolymerised to give a copolymer with a mean molecular weight within the range of 10,000 to 20,000 and preferably 11,000 to 15,000. A particularly preferred copolymer is derived by depolymerising the copolymer of isobutene and from 1 to 3 wt. percent of isoprene.

A suitable method of depolymerising polymers, e.g. butyl rubber, is by mastication of the polymer at an elevated temperature (150–200° C.) with a small proportion of a suitable catalyst; for example, from 0.2 to 0.5% of mercaptobenzthiazole.

The mean molecular weight of the hydrocarbon plasticiser is below 350 and preferably above 100. The plasticiser comprises a minor proportion of the reaction mixture and concentrations from 10 to 40 wt. percent based on total reaction mixture are preferred. The plasticiser may be a saturated hydrocarbon such as technical white oil or bright stock or a petroleum distillate boiling within the range 200 to 400° C., e.g. a gas oil or diesel cut. A diesel cut boiling within the range 262 to 348° C. is suitable for use as a plasticiser.

Plasticisers containing some unsaturated are preferred. The use of polymers bottoms as a plasticiser is particularly preferred. The term polymer bottoms refers to the material, insufficiently volatile for use in gasoline, obtained from polymer gasoline preparation. The preferred polymer bottoms boils within the range of 200 to 270° C. and/or has a mean molecular weight within the range 170 to 340. Bottoms from the rerun of U.O.P. polymer gasoline may be used and typical inspection data are shown in Table I.

TABLE I
Inspection data on U.O.P. polymer bottoms

| | | Distillation | |
|---|---|---|---|
| Ash content, wt. percent | 0.04 | I.B.P | 217° C. |
| Sulphur, wt. percent | Nil | 10% | 224. |
| Phosphorus, wt. percent | 0.012 | 50% | 229.5. |
| Bromine No | 23.6 | 90% | 248. |
| Specific Gravity at 60° F | 0.8195 | F.B.P | 267. |
| Mean Molecular Weight [1] | 202 | Residue | 1%. |
| Viscosity in cs. at 146° F | 1.7 | Recovery | 99%. |

[1] Determined cryoscopically.

The utilisation of phosphorus pentasulphide may be increased by the addition to the reactants of an aliphatic alcohol or mixtures thereof containing more than 8 carbon atoms. The preferred alcohols contain less than 20 carbon atoms such as lauryl, myristyl, palmityl and stearyl alcohols. From 0.2 to 2% of the aliphatic alcohol may be added to the polymer and plasticiser before the addition of phosphorus sulphide.

EXAMPLE I

Table II shows the sludge suspending power of the product obtained by phosphosulphurising a depolymerised butyl rubber and polymer bottoms. The sludge suspending powers of similarly but separately phosphosulphurised depolymerised butyl rubber and polymer bottoms included in Table II clearly demonstrate a synergistic effect and the qualities of the product obtained by the process of this invention.

TABLE II

| Material Treated | 15 wt. percent $P_2S_5$ Treatments | |
|---|---|---|
| | Treating time [1] (hrs.) at 190–220° C. | Dispercency Number [2] |
| 13,000 Staudinger mean mol. wt. depolymerised butyl rubber [3] | 4.25 / 6.00 / 8.50 | 78 / 17 / 15 |
| Polymers bottoms [4] | | |
| 70% 13,000 mol. wt. butyl rubber [3] / 30% polymer bottoms | 8.25 | 100 |

[1] The variations in treating time in this table are unimportant as it has been found that the reaction is essentially complete after 4 hours a 190–220° C.
[2] The Dispercency Number is a measure of the amount of a standard dry used oil sludge that can be suspended in an oil blend containing 5% by weight of the additive.
[3] The composition of the butyl rubber was approximately 98% isobutylene and 2% isoprene.
[4] The composition of the polymer bottoms is given in Table I.

EXAMPLE II

A mixture of 70% 13,000 molecular weight depolymerised butyl rubber and 30% marine diesel fuel was treated with 15 wt. percent phosphorus pentasulphide for 8 hours at 190 to 220° C. The product had a dispercency number of 83.

The marine diesel fuel was a paraffinic type of distillate with a boiling range of 505 to 650° F. and a kinematic viscosity of about 2.7 cs. at 146° F. The composition of butyl rubber was approximately 98% isobutylene and 2% isoprene.

The product of the invention may be used as a detergent additive or may be neutralised or intermixed preferably by reaction at 100 to 200° C., with the group I or group II metal bases, e.g. Ba, such as the oxides or hydroxides, or with high alkalinity oil-soluble metal sulphonates e.g. barium salts of petroleum sulphonates of mol. wt. 900 to 1100, phenates or sulphurised phenates of group I, group II or group III metals or with nitrogenous basic compounds such as guanidine, and particularly with barium salts of alkyl phenol sulphides, e.g. the barium salt of di(octyl phenol) sulphide.

Preferred barium salts of alkyl phenol sulphides may be obtained by heating a mixture of oil and the barium salt of an alkyl phenol with sulphur. The product so obtained may be used after blowing with carbon dioxide or after further reaction with barium oxide and carbon dioxide blowing. The preparation of suitable barium salts of alkyl phenol sulphides are described in the specification of our British Patents Nos. 586,841 and 720,372.

EXAMPLE III

A mixture of 210 g. 13,000 (Staudinger) mean molecular weight depolymerised butyl rubber consisting of 98% isobutylene, 2% isoprene approximate molecular weight 40,000 (Staudinger) and 90 g. marine diesel fuel was treated with 45 g. phosphorus pentasulphide (with stirring, and under a nitrogen blanket) for 8 hours at 190–220° C. (The product could be dissolved in twice its weight of a paraffinic solvent-extracted distillate oil 150 S.U.S. 100° F., and the solution filtered through paper and cloth, no filter aid being necessary.) Inspection data on the product, i.e. on a diluent oil-free basis, are compared in Table III with similar preparations without plasticiser and with marine diesel fuel or U.O.P. polymer bottoms as plasticiser. In each case, 15 wt. percent phosphorus pentasulphide was employed and 13,000 mol. wt. butyl rubber.

TABLE III

| Plasticiser | None | None | Marine diesel (30%) | Polymer bottoms (30%) |
|---|---|---|---|---|
| Treating time, hrs | 4½ | 10 | 8 | 9 |
| Treating temp., ° C | 195–233 | 195–240 | 190–220 | 180–220 |
| Phosphorus, wt. percent | 2.16 | 2.22 | 1.53 | 3.12 |
| Sulphur, wt. percent | 3.77 | 3.71 | 4.52 | 5.86 |
| Saponification No., mg. KOH/g | 143 | 148 | 155 | 169 |

The marine diesel fuel was from an Iraq crude and had the following properties:

Nominal boiling range _____ ° C __ 263–343
Molecular weight _____ 260
Sulphur content _____ wt. percent __ 1.23

It appears that although the diesel fuel was a good plasticiser in that it facilitated stirring, it did not increase the utilisation of the phosphorus pentasulphide to the extent obtained with polymer bottoms. The properties of the polymer bottoms are given in Table I.

EXAMPLE IV

Phosphosulphurised derivatives A and B were prepared by heating the reactants of Table IV at 190–220° C. for 4 hours.

TABLE IV

| | A | B |
|---|---|---|
| 13,000 mol. wt. butyl rubber _____ grams | 225 | 225 |
| U.O.P. polymer bottoms _____ grams | 25 | 25 |
| Lauryl alcohol _____ grams | 1.25 | 0 |
| Phosphorus pentasulphide _____ grams | 37.5 | 37.5 |

The butyl rubber consisted of about 98% isobutylene and 2% isoprene and had a molecular weight of 40,000. The properties of the U.O.P. polymer bottoms are shown in Table I.

The results are compared in Table V.

TABLE V

| Preparation | A | B |
|---|---|---|
| Phosphorus, wt. percent | 3.08 | 2.24 |
| Sulphur, wt. percent | 6.33 | 5.31 |
| Saponification No., mg. KOH/g | 259 | 269 |

The presence of lauryl alcohol has appreciably improved the utilisation of phosphorus pentasulphide.

Neutralisation was then carried out by mixing at room temperature the reactants in the proportions shown in Table VI.

TABLE VI

| | Wt. Percent |
|---|---|
| Phosphosulphurised derivative | 36 |
| Barium petroleum sulphonate [1] | 48 |
| Oil concentrate of barium salt of an alkyl phenol sulphide [2] | 16 |

[1] Barium, wt. percent _____ 15.6
    Total base no. mg. KOH/g _____ 66.4

[2] The barium salt of an alkyl phenol sulphide was prepared as follows: Cetyl-stearyl alcohol (840 g.), p-iso-octyl phenol (3640 g.), and lubricating mineral oil (6792 g.) were heated to 187° C. at which temperature barium oxide (2026 g.) was added over a period of about 1¼ hours. The mixture was then heated at 187° C. for 3½ to 4 hours after which it was cooled to 170° C. At this temperature sulphur (825 g.) was added over a period of ½ hour and the temperature maintained a further 1½ hours at 170° C. Barium oxide (190 g.) was added over ¼ hour and the temperature maintained at 170° C. for a further hour. The product was blown with 16% by weight of carbon dioxide at 160° C. and 3% to 5% of steam volatile materials were removed by steam distillation. Product was filtered to give an oil concentrate of the barium salt of p-iso-octyl phenol sulphide containing 12.5% of barium.

Paraffinic solvent-extracted distillate oil 150 S.U.S. 100° F. was finally added to give a neutralised concentrate consisting of 75 wt. percent active ingredient and 25 wt. percent diluent oil. Inspection results are given in Table VII of the product obtained from the phosphosulphurised derivatives A and B.

TABLE VII

| Neutralised concentrate derived from phosphosulphurised derivative | A | B |
|---|---|---|
| Acidity, mg. KOH/g | 0.8 | Nil |
| Saponification No., mg. KOH/g | 62.9 | 47.8 |
| Barium, wt. percent | 6.50 | 7.26 |
| Phosphorus, wt. percent | 0.89 | 1.00 |
| Sulphur, wt. percent | 2.60 | 2.90 |
| Kin. Viscosity at 120° F., cs | 236 | 302 |
| Hydrogen sulphide rating ([1]) | 7 | 5 |
| Colour, Tag Robinson: | | |
| 1 wt. percent in white oil | 11½ | 9¾ |
| 5 wt. percent in white oil | 1¼ | ¼ |

[1] Colourimetric measurement using lead acetate paper of $H_2S$ evolution of 5 wt. percent additive in Solvent 150 Neutral.

In both of the preparations of Table VI, neutralisation was carried out at a high temperature (approximately 280° C.) to prevent the formation of gel.

EXAMPLE V

A 50/50 (wt.) mixture of 13,000 mol. wt. depolymerised butyl rubber (98% isobutylene, 2% isoprene) and bright stock i.e. a deasphalted residuum, was treated with 15 wt. percent phosphorus pentasulphide. The treatment was for four hours at 210–240° C. Inspection data of the product are compared in Table VIII with those for a preparation where the depolymerised butyl rubber was treated for four hours at 190–220° C. using 15 wt. percent phosphorus pentasulphide without the use of a plasticiser.

TABLE VIII

| Plasticiser | No Plasticiser | Bright Stock |
|---|---|---|
| Phosphorus, wt. percent | 2.24 | 2.73 |
| Sulphur, wt. percent | 5.31 | 6.25 |
| Saponification No., mg. KOH/g | 269 | 73 |

The uptake of phosphorus and sulphur has been increased by the presence of 50% bright stock. Neutralisation (at 250–280° C.) was then carried out, using the reactants in the following proportions:

| | Wt. Percent |
|---|---|
| Phosphosulphurised derivative | 36 |
| Barium petroleum sulphonate [1] | 48 |
| Oil concentrate of barium salt of an alkyl phenol sulphide [2] | 16 |

[1] Barium, wt. percent _____ 15.6
    Total base no. mg. KOH/g _____ 66.4

[2] The same concentrate used in Example IV.

Paraffinic solvent-extracted distillate oil 150 S.U.S. 100° F. was finally added to give a concentrate consisting of 75 wt. percent active ingredient and 25 wt. percent diluent oil. Inspection data on the product are compared in Table IX with data from a preparation where bright stock was not employed.

TABLE IX

| Plasticiser | No Plasticiser | Bright Stock |
|---|---|---|
| Acidity mg. KOH/g | Nil | 3.0 |
| Saponification No., mg. KOH/g | 47.8 | 55.7 |
| Barium, wt. percent | 7.26 | 7.04 |
| Phosphorus, wt. percent | 1.00 | 0.89 |
| Sulphur, wt. percent | 2.90 | 3.26 |

The product was treated with 1 wt. percent fuller's earth (MQC clay) and 0.2 wt. percent of a filter aid for 30 minutes at 150° C. before filtration.

The product and/or neutralised product may be used as an additive for animal, vegetable, mineral or synthetic oils in the preferred concentrations of from 0.1% to 10 wt. percent. Higher concentrations up to 70% may be prepared for storage purposes. Lubricating oil compositions containing the product and neutralised product of the present invention may also contain conventional pour point depressants, oxidation inhibitors, viscosity index improvers, oiliness carriers, rust preventives and anti-foam agents.

What we claim is:

1. An improved phosphosulfurized lubricating oil additive prepared by phosphosulfurizing, at a temperature in the range of 150° to 250° C. for 4 to 8 hours, a hydrocarbon polymer derived from the polymerization of $C_3$ to $C_6$ mono-olefins and having an average molecular weight above 10,000 with about 8 to 15 wt. percent of a phosphorus sulphide in the presence of 10 to 40 wt. percent of polymer bottoms obtained from polymer gasoline preparation and having an average molecular weight of less than 350 and boiling in the range of 200 to 270° C.

2. An additive according to claim 1, wherein said phosphosulfurizing step is carried out with phosphorus pentasulfide.

3. An additive according to claim 1 in which the polymer is a depolymerised butyl rubber consisting of isobutene and from 1 to 3 weight percent of isoprene having a Staudinger molecular weight below 20,000.

4. A phosphosulphurised lubricating oil additive prepared by neutralizing the phosphosulphurised derivative of claim 1 with a material selected from the group consisting of high alkalinity oil-soluble metal sulphonate and barium salt of an alkyl phenol sulphide.

5. A neutralised phosphosulphurised additive according to claim 4 in which the metal sulphonate is barium petroleum sulphonate of molecular weight from 900 to 1100.

6. A process for preparing an improved phosphosulfurized lubricating oil additive which comprises phosphosulfurizing, at a temperature in the range of 150° to 250° C. for 4 to 8 hours, a hydrocarbon polymer derived from the polymerization of $C_3$ to $C_6$ mono-olefins of at least 10,000 molecular weight with about 8 to 15 wt. percent of a phosphorus sulfide in the presence of 10 to 40 wt. percent of polymer bottoms obtained from polymer gasoline preparation and having an average molecular weight of 100 to 350 and boiling in the range of 200 to 270° C.

7. A process according to claim 6, wherein said phosphosulfurized material is neutralized with material selected from the group consisting of a high alkalinity oil-soluble metal sulphonates and barium salt of an alkyl phenol sulfide.

(References on following page)

References Cited in the file of this patent

UNITED STATES PATENTS

| | | |
|---|---|---|
| 2,316,089 | Anderson | Apr. 6, 1943 |
| 2,460,041 | Sparks et al. | Jan. 25, 1949 |
| 2,507,731 | Mixon et al. | May 16, 1950 |
| 2,595,819 | Smyers et al. | May 6, 1952 |
| 2,664,202 | Bartleson | Dec. 29, 1953 |
| 2,695,271 | Hughes et al. | Nov. 23, 1954 |
| 2,712,528 | Hill et al. | July 5, 1955 |
| 2,736,701 | Neff | Feb. 28, 1956 |

FOREIGN PATENTS

| | | |
|---|---|---|
| 700,578 | Great Britain | Dec. 2, 1953 |